United States Patent [19]

Müller et al.

[11] Patent Number: 5,021,536

[45] Date of Patent: Jun. 4, 1991

[54] STORAGE STABLE RESIN REACTION MIXTURES, AND THE PREPARATION AND USE THEREOF

[75] Inventors: Hanns P. Müller, Bergisch Gladbach; Heinrich Heine, Leverkusen, both of Fed. Rep. of Germany

[73] Assignee: Bayer Aktiengesellschaft, Leverkusen, Fed. Rep. of Germany

[21] Appl. No.: 317,162

[22] Filed: Feb. 28, 1989

[30] Foreign Application Priority Data

Mar. 9, 1988 [DE] Fed. Rep. of Germany ....... 3807660

[51] Int. Cl.$^5$ ...................... C08G 18/00; C08G 18/58
[52] U.S. Cl. ..................................... 528/73; 521/121; 521/131; 521/156
[58] Field of Search .................. 528/73; 521/121, 131, 521/156

[56] References Cited

U.S. PATENT DOCUMENTS

| | | | |
|---|---|---|---|
| 4,855,383 | 8/1989 | Dammann et al. | 528/73 |
| 3,352,829 | 11/1967 | Blomeyer et al. | 528/73 |
| 4,129,554 | 12/1978 | Karasawa et al. | 528/48 |
| 4,189,562 | 2/1980 | Dieterich | 528/75 |
| 4,211,850 | 7/1980 | Dieterich | 528/75 |
| 4,237,250 | 12/1980 | Dieterich | 528/73 |
| 4,377,646 | 3/1983 | Blount | 528/73 |
| 4,582,723 | 4/1986 | Markert et al. | 427/116 |
| 4,728,676 | 3/1988 | Müller et al. | 521/107 |
| 4,788,224 | 11/1988 | Müller et al. | 521/104 |
| 4,831,076 | 5/1989 | Lidy et al. | 521/156 |

FOREIGN PATENT DOCUMENTS 1115922 10/1961 Fed. Rep. of Germany .
3204809 9/1982 Fed. Rep. of Germany .

OTHER PUBLICATIONS

Journal of Cellular Plastics, May/Jun., 1972, K. Ashida and K. C. Frisch, pp. 160–167.

*Primary Examiner*—John Kight, III
*Assistant Examiner*—Rabon Sergent
*Attorney, Agent, or Firm*—Joseph C. Gil; Richard E. L. Henderson

[57] ABSTRACT

This invention relates to storage stable resin reaction mixtures obtained by mixing at least one organic polyisocyanate, at least one organic compound containing at least two epoxide groups, at least one alkylating agent that inhibits the reaction of the polyisocyanate and epoxide components, and optional auxiliary agents and additives. The present invention further relates to a process for the preparation of such reaction mixtures and to their use.

17 Claims, No Drawings

STORAGE STABLE RESIN REACTION MIXTURES, AND THE PREPARATION AND USE THEREOF

BACKGROUND OF THE INVENTION

This invention relates to resin reaction mixtures that are stable during storage and to their preparation and use. Reaction mixtures of polyepoxides and polyisocyanates are becoming more important as starting components for the production of high quality polyaddition plastics. For example, with the aid of curing catalysts, 1,2-epoxides and polyisocyanates may be used to produce plastics having isocyanurate and oxazolidinone structures (DE-AS 1,115,922). Heat hardening resin reaction mixtures for impregnation and embedding are described in U.S. Pat. No. 4,582,723. Such resins are used as electrical insulating materials in numerous applications. Such resins may also be used for the production of rigid structural parts with high dimensional stability under heat. Heat curing resin reaction mixtures containing an organic polyisocyanate, at least one organic compound carrying two epoxide groups, a catalyst which can be activated by heat and optionally other auxiliary agents and additives have already been disclosed in DE-A 3,600,764.

The use of resin reaction mixtures from polyisocyanates and polyepoxides for the synthesis of foam plastics has also been described. E.g., K. Ashida and K. C. Frisch, *J. Cell. Plastics,* May/June 1972, page 160 et seq. However, the resin reaction mixtures have not been widely used industrially because the mixtures of polyepoxides and polyisocyanates have not been sufficiently stable in storage. A slow increase in viscosity prevents their use in the machines that are generally used today for metering reaction resins in industrial processes. The preparation of fresh resin reaction mixtures necessitates expensive storage methods and rapid processing of the freshly prepared material. It would, therefore, be desirable to obtain storage stable mixtures of polyepoxides and polyisocyanates which do not change their viscosity even when stored for prolonged periods in closed vessels at 40° to 50° C.

An object of the present invention was, therefore, to provide storage stable mixtures of polyepoxides and polyisocyanates which would allow the reaction resins to have a wide application as electrical insulating materials, as foams with high heat resistance, as lacquer binders, as adhesive draw materials, and as matrix materials for construction materials.

SUMMARY OF THE INVENTION

This invention relates to compositions comprising storage stable resin reaction mixtures obtained by mixing
(a) at least one organic polyisocyanate,
(b) at least one organic compound containing at least two epoxide groups,
(c) at least one alkylating agent that inhibits the reaction of component (a) and component (b), and optionally
(d) further auxiliary agents and additives.

It is extremely surprising that such treatment with alkylating agents (c) stabilizes the reaction mixtures since it is well known that epoxides are themselves alkylating agents. A heat treatment of the mixture of starting components without the addition of alkylating agents according to the invention does not provide the required stabilization (see Example 2). Reaction retarders or stoppers known in isocyanate chemistry, such as acids and acid halides, also fail to produce permanent stabilization of the resin mixture.

The present invention also relates to a process for the preparation of the storable mixtures according to the invention, wherein components (a) to (c) and optionally (d) are added together either all at once or successively and at least components (b) and (c) (or even all the components together) are subjected to a heat treatment.

The present invention further relates to the use of the multi-component reactive resin mixtures according to the invention, optionally after the addition of known catalysts, as starting components for the production of molded articles, electrical insulating materials, coatings, adhesives, and foams.

DESCRIPTION OF THE INVENTION

Preferred storage stable resin reaction mixtures have a viscosity of from about 20 to about 20,000 mPa.s at 25° C. In another preferred embodiment, the polyisocyanates used may be solid at room temperature. Such polyisocyanates are optionally mixed with the other components with the aid of solvents and, after removal of the solvent, are then present together with these other components in a solid form.

Starting component (a) may be any organic polyisocyanates of the type known from polyurethane chemistry, such as aliphatic, cycloaliphatic, araliphatic, aromatic and heterocyclic polyisocyanates of the type described, for example, by W. Siefken in *Justus Liebigs Annalen der Chemie,* 562, pages 75 to 136. Suitable organic polyisocyanates include compounds corresponding to the formula

Q(NCO)$_n$, wherein
n is a number of from about 2 to about 4, preferably 2, and
Q is an aliphatic hydrocarbon group having about 2 to about 18, preferably 6 to 10, carbon atoms: a cycloaliphatic hydrocarbon group having about 4 to about 15, preferably 5 to 10, carbon atoms; an aromatic hydrocarbon group having about 6 to about 15, preferably 6 to 13, carbon atoms: or an araliphatic hydrocarbon group having about 8 to 15, preferably 8 to 13, carbon atoms. Such organic polyisocyanates include ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate and any mixtures of the isomers, 1-isocyanato-3,3,5-trimethyl-5-isocyanatomethylcyclohexane (see DE-AS 1,202,785, U.S. Pat. No. 3,401,190), 2,4- and 2,6-hexahydrotolylene diisocyanate and any mixtures of the isomers, hexahydro-1,3- and/or -1,4-phenylene diisocyanate, perhydro-2,4'- and/or -4,4'-diphenylmethane diisocyanate, 1,3- and 1,4-phenylene diisocyanate; 2,4- and 2,6-tolylene diisocyanate and any mixtures of the isomers, diphenylmethane-2,4'- and/or -4,4 '-diisocyanate, and naphthylene-1,5-diisocyanate.

Other suitable organic polyisocyanates include triphenylmethane-4,4',4''-triisocyanate; polyphenyl-polymethylene polyisocyanates obtainable by aniline-formaldehyde condensation followed by phosgenation (e.g., GB 874,430 and 848,671), m- and p-isocyanatophenylsulfonyl isocyanates (e.g, U.S. Pat. No. 3,454,606): perchlorinated aryl polyisocyanates (e.g., U.S. Pat. No. 3,277,138): polyisocyanates containing carbodiimide groups (e.g., U.S. Pat. No. 3,152,162); norbornane diisocyanates (e.g., U.S. Pat. No. 3,492,330): polyisocyanates containing allophanate groups (e.g., GB 994,890); polyisocyanates containing isocyanurate groups (e.g., U.S. Pat. No. 3,001,973); polyisocyanates containing urethane groups (e.g., U.S. Pat. Nos. 3,394,164 and 3,644,457); polyisocyanates containing acylated urea groups (e.g., DE-PS 1,230,778); polyisocyanates containing biuret groups (e.g., U.S. Pat. Nos. 3,124,605, 3,201,372, and 3,124,605); polyisocyanates prepared by telomerization reactions (e.g., U.S. Pat. No. 3,654,106); polyisocyanates containing ester groups (e.g., U.S. Pat. No. 3,567,763): reaction products of the above mentioned isocyanates with acetals (e.g., DE-PS 1,072,385); and polyisocyanates containing polymeric fatty acid esters (e.g., U.S. Pat. No. 3,455,883).

Suitable organic polyisocyanates also include the distillation residues containing isocyanate groups from the commercial production of isocyanates, optionally dissolved in one or more of the above mentioned polyisocyanates. Any mixtures of the above mentioned polyisocyanates may also be used.

Preferred organic polyisocyanates include readily available polyisocyanates such as 2,4- and 2,6-tolylene diisocyanate and any mixtures of these isomers ("TDI"): polyphenyl-polymethylene polyisocyanates of the type which may be prepared by aniline-formaldehyde condensation followed by phosgenation ("crude MDI"); and polyisocyanates containing carbodiimide groups, urethane groups, allophanate groups, isocyanurate groups, urea groups or biuret groups ("modified polyisocyanates"), especially those modified polyisocyanates which are derived from 2,4- and/or 2,6-tolylene diisocyanate or from 4,4'- and/or 2,4'-diphenylmethane diisocyanate.

Particularly preferred organic polyisocyanates include mixtures of isomers and/or homologs of polyisocyanates of the diphenylmethane series containing more than about 20% by weight of 2,4'-diisocyanatodiphenylmethane. Such preferred polyisocyanate mixtures enriched with 2,4'-isomers contain more than about 20% by weight, preferably from about 30 to about 70% by weight, of 2,4'-diisocyanatodiphenylmethane. In addition to the 2,4'-isomers, the particularly preferred polyisocyanate component generally contains other isomeric or homologous polyisocyanates of the diphenylmethane series. Thus, the particularly preferred polyisocyanate component generally consists of mixtures of 2,4'-diisocyanatodiphenylmethane and 4,4'-diisocyanatodiphenylmethane and optionally 0 to about 20% by weight (based on the total mixture) of 2,2'-diisocyanatodiphenylmethane, or consists of mixtures of these isomers with higher nuclear polyphenyl-polymethylene polyisocyanates. The mixtures containing higher nuclear polyphenyl-polymethylene polyisocyanates generally contain from about 10 to about 60% by weight (based on the total quantity of the mixture) of the higher nuclear polyisocyanates. Diisocyanate mixtures enriched with 2,4'-isomers (the first-named of the particularly preferred polyisocyanate mixtures) may be obtained, for example, by distilling off a diisocyanate mixture of the desired composition from a polyisocyanate mixture obtained by the phosgenation of aniline-formaldehyde condensates. Mixtures containing higher nuclear polyisocyanates (the second of the particularly preferred polyisocyanate mixtures) may be obtained, for example, by back-mixing the above-mentioned distillation product with a 4,4'-diisocyanatodiphenylmethane-depleted phosgenation product obtained, for example, according to DE-AS 1,923,214. Preferred polyisocyanate mixtures containing the proportion of 2,4'-diisocyanatodiphenylmethane indicated above may also be obtained directly by suitably controlling the aniline-formaldehyde condensation process. A method for obtaining polyamine mixtures of the diphenylmethane series containing a high proportion of 2,4'-diaminodiphenylmethane is described, for example, in U.S. Pat. No. 3,277,173. The particularly preferred polyisocyanates may then be obtained by phosgenating these polyamine condensates having a high 2,4'-diaminodiphenylmethane content. Methods of obtaining such polyisocyanate mixtures are also described in DE-OS 1,937,685 and in U.S. Pat. No. 3,362,979. In the particularly preferred polyisocyanate mixtures containing higher nuclear polyisocyanates of the diphenylmethane series, the 2,4'-diisocyanatodiphenylmethane content is also above 20% by weight, based on the weight of the total mixture.

Component (b) may be any aliphatic, cycloaliphatic, aromatic or heterocyclic compounds containing at least two epoxide groups, preferably containing 1,2-epoxide groups. The preferred polyepoxides used as component (b) have from 2 to 4, preferably 2, epoxide groups per molecule and an epoxide equivalent weight of from 90 to 500, preferably from 170 to 220. Suitable polyepoxides include polyglycidyl ethers of polyvalent phenols, for example of pyrocatechol, resorcinol, hydroquinone, 4,4'-dihydroxydiphenylmethane, 4,4'-dihydroxy-3,3'-dimethyldiphenylmethane, 4,4'-dihydroxydiphenylmethane, 4,4'-dihydroxydiphenylcyclohexane, 4,4'-dihydroxy-3,3'-dimethyldiphenylpropane, 4,4'-dihydroxydiphenyl, 4,4'-dihydroxydiphenyl sulfone, and tris(4-hydroxyphenyl)methane: of the chlorination and bromination products of the above-mentioned diphenols: of novolaks (i.e., reaction products of monovalent or higher valent phenols with aldehydes, in particular formaldehyde, in the presence of acid catalysts): of diphenols obtained by the esterification of two moles of the sodium salt of an aromatic hydroxycarboxylic acid with one mole of a dihalogenated alkane or a dihalogenated dialkyl ether (see GB-PS 1,017,612): or of polyphenols obtained by the condensation of phenols with long chain halogenated paraffins containing at least two halogen atoms (see GB-PS 1,024,288).

Other suitable polyepoxides include polyepoxide compounds based on aromatic amines and epichlorohydrin, such as N-di(2,3-epoxypropyl)aniline, N,N'-dimethyl-N,N'-diepoxypropyl-4,4'-diaminodiphenylmethane, and N,N-diepoxypropyl-4-aminophenyl glycidyl ether (see GB-PS 772,830 and 816,923).

Suitable polyepoxides also include glycidyl esters of polyvalent aromatic, aliphatic, and cycloaliphatic carboxylic acids. Examples of suitable glycidyl esters include diglycidyl phthalate; diglycidyl adipate; glycidyl esters of reaction products of one mole of an aromatic or cycloaliphatic dicarboxylic acid anhydride and ½ mole of a diol or 1/n mole of a polyol containing n hydroxyl groups; and the diglycidyl ester of hexahydrophthalic acid, optionally substituted with methyl groups.

Suitable polyepoxides also include glycidyl ethers of polyhydric alcohols, for example, of 1,4-butanediol, 1,4-butenediol, glycerol, trimethylolpropane, pentaerythritol, and polyethylene glycols; triglycidyl isocyanurate: N,N'-diepoxypropyloxamide; polyglycidyl thio ethers of polyvalent thiols such as bis-mercaptomethylbenzene; diglycidyl trimethylene trisulfone: and polyglycidyl ethers based on hydantoins.

Still other suitable polyepoxides include epoxidation products of polyunsaturated compounds such as vegetable oils and their conversion products: epoxidation products of di- and polyolefins, such as butadiene, vinyl cyclohexane, 1,5-cyclooctadiene, 1,5,9-cyclododecatriene, and polymers and copolymers that retain epoxidizable double bonds such as those based on polybutadiene, polyisoprene, butadiene-styrene copolymers, divinyl benzene, dicyclopentadiene and unsaturated polyesters; epoxidation products of olefins obtainable by Diels-Alder addition and subsequently converted into polyepoxides by epoxidation with peroxy compounds: and epoxidation products obtained from compounds containing two cyclopentene or cyclohexane rings linked through bridging atoms or other bridging groups. Polymers of unsaturated monoepoxides, such as methacrylic acid glycidyl esters and allyl glycidyl ethers, are also suitable.

Preferred polyepoxide compounds for use as component (b) include polyglycidyl ethers of polyvalent phenols, in particular of bisphenol A: polyepoxide compounds based on aromatic amines, in particular bis(N-epoxypropyl)aniline, N,N'-dimethyl-N,N'-diepoxypropyl-4,4'-diaminodiphenylmethane, and N,N-diepoxypropyl-4-aminophenyl glycidyl ether: polyglycidyl esters of cycloaliphatic dicarboxylic acids, in particular hexahydrophthalic acid diglycidyl ester, and polyepoxides of the reaction product of n moles of hexahydrophthalic acid anhydride and one mole of a polyol containing n hydroxyl groups (wherein n is an integer from 2 to 6), in particular three moles of hexahydrophthalic acid anhydride and one mole of 1,1,1-trimethylolpropane, and 3,4-epoxycyclohexylmethane-3,4-epoxycyclohexane carboxylate.

Liquid polyepoxides or low viscosity diepoxides, such as bis(N-epoxypropyl)aniline or vinyl cyclohexane diepoxide, may in special cases further reduce the viscosity of already liquid polyepoxides or convert solid polyepoxides into liquid mixtures.

Component (b) is used in a quantity corresponding to an equivalent ratio of isocyanate groups to epoxide groups of from about 1.2:1 to about 500:1, preferably from about 3:1 to about 65:1, especially from about 5:1 to about 30:1.

Suitable alkylating agents (c) include essentially any alkylating esters of organic sulfonic acids, preferably those having a molecular weight from 110 to 250. Such alkylating esters are capable of transferring the alkyl groups to suitably reactive sites in other molecules. Both aliphatic and aromatic sulfonic acid alkyl esters can be used. Suitable aliphatic sulfonic acid alkyl esters include butanesulfonic acid methyl ester, n-perfluorobutanesulfonic acid methyl ester, and hexanesulfonic acid ethyl ester. Suitable aromatic sulfonic acid alkyl esters include benzenesulfonic acid methyl ester, ethyl ester, or butyl ester, p-toluenesulfonic acid methyl ester, ethyl ester, or butyl ester, 1-naphthalenesulfonic acid methyl ester, 3-nitrobenzenesulfonic acid methyl ester, and 2-naphthalenesulfonic acid methyl ester. The aromatic sulfonic acid esters are preferred, particularly p-toluenesulfonic acid methyl ester, as component (c). Methyl iodide and dimethyl sulfate may also be used as component (c) but are less preferred. Preferred alkylating agents (c) contain transferable alkyl groups having from about 1 to about 4 carbon atoms.

Component (c) is preferably used in quantities of from about 0.001 to about 1% by weight, preferably from about 0.005 to about 0.3% by weight, based on the total weight of components (a) and (b). Component (c) may be added to the multicomponent system in the pure form or, for example, as a solution in component (a).

Suitable optionally used auxiliary agents and additives (d) include, for example, (d1) polymerizable, olefinically unsaturated monomers, which may be used in quantities of up to about 100% by weight, preferably up to about 50% by weight, based on the total weight of components (a) and (b). ps Examples of additives (d1) include olefinically unsaturated monomers that are free from isocyanate-reactive hydrogen atoms, for example, diisobutylene; styrene: ($C_1$–$C_4$ alkyl)styrenes, such as alpha-methylstyrene and alpha-butylstyrene: vinyl chloride; vinyl acetate: maleimide derivatives, such as bis(4-maleimidophenyl)methane; $C_1$–$C_8$ alkyl esters of acrylic acid, such as methyl acrylate, butyl acrylate, and octyl acrylate, and the corresponding methacrylic acid esters: acrylonitrile: and diallyl phthalate. Mixtures of such olefinically unsaturated monomers may also be used. Preferred additives (d1) include styrene and/or $C_1$–$C_4$ alkyl esters of acrylic or methacrylic acid, or mixtures thereof.

When additives (d1) are used, conventional polymerization initiators such as benzoyl peroxide may be used but are generally not necessary.

Other suitable optionally used auxiliary agents and additives (d) include, for example, (d2) organic compounds in the molecular weight range of from about 62 to about 2000 containing at least 2, preferably 2 to 8 and more preferably 2 or 3, alcoholic hydroxyl groups, such as the compounds normally used as starting components for preparing polyurethanes.

Examples of additives (d2) include simple polyhydric alcohols, such as ethylene glycol, 1,6-hexanediol, glycerol, and trimethylolpropane: polyols containing dimethylsiloxane units, e.g., bis(dimethylhydroxymethylsilyl) ethers; polyhydroxyl compounds containing ester groups, such as castor oil, or polyhydroxy polyesters of the type obtained by the polycondensation of excess quantities of simple polyhydric alcohols of the type exemplified above with carboxylic acids (preferably dibasic carboxylic acids) or anhydrides of such acids, e.g., adipic acid, phthalic acid, and phthalic acid anhydride; and polyhydroxy polyethers obtained by the addition of alkylene oxides, such as propylene oxide and/or ethylene oxide, to suitable starter molecules such as water, the simple alcohols mentioned above, or amines containing at least two amine NH bonds.

If used at all, the additives (d2) are used at most in a quantity corresponding to an NCO/OH equivalent ratio of at least about 2:1, preferably at least 2.5:1, based on the isocyanate groups of component (a) and the hydroxyl groups of component (d2). The quantity of component (a) must always be such that the equivalent ratio of isocyanate groups of component (a) to the sum of epoxide groups in component (b), the hydroxyl groups in component (d2), and any hydroxyl groups that be present in component (b) is at least about 1.12:1, preferably from 4:1 to 30:1.

It is generally not necessary to use auxiliary agents and additives (d1) or (d2), but the additives mentioned as examples under (d1) are preferred to the compounds mentioned under (d2). It is possible in principle to use both types of auxiliary agents and additives.

Other optionally used auxiliary agents and additives (d) include, for example, fillers such as quartz powder, chalk, or aluminum oxide; pigments such as titanium dioxide, iron oxide, or organic pigments such as phthalocyanin pigments: plasticizers, such as dioctyl phthalate, tributyl phosphate, or triphenyl phosphate: incorporable substances which confer compatibility, such as methacrylic acid beta-hydroxypropyl ester, maleic acid esters, and fumaric acid esters: soluble dyes: and reinforcing materials such as glass fibers or glass fabrics. Carbon fibers and carbon fiber fabrics and other organic polymer fibers such as aramide fibers or liquid crystal ("LC") polymer fibers are also suitable.

The auxiliary agents and additives may be incorporated with the starting materials (a) and (b) before the process according to the invention is carried out or they may be added later with the resin in storage stable form.

To carry out the process according to the invention, starting materials (a), (b), and (c), as well as any optional auxiliary agents and additives (d), or a part thereof are mixed together simultaneously or successively. All of the components can be combined and heated within the temperature range of from about 20° to about 150° C., preferably from about 60° to about 130° C. Alternatively, an initial mixture containing at least components (b) and (c) can be prepared and then heated, with the remaining components being subsequently added.

Catalysts and, optionally, any other auxiliary agents and additives are added to the intermediate products for further processing, optionally after they have been dissolved in a suitable solvent. If the resins are to be worked up as solutions, either inert solvents, such as acetone, butyl acetate, methyl ethyl ketone, N-methylpyrrolidone, or mixtures thereof, or so-called reactive diluents may be used. The substances used as reactive diluents may be polyisocyanates of the type exemplified under (a) which are liquid at room temperature or polyepoxides of the type exemplified under (a) which are also liquid at room temperature. However, it is always necessary to ensure that such mixtures contain an excess of isocyanate groups over epoxide groups and hydroxyl groups in an equivalent ratio of at least about 1.2:1, preferably at least 3:1.

Monoisocyanates such as stearyl isocyanate and monoepoxides such as phenoxypropylene oxide may also be added, preferably in quantities of up to 10% by weight, based on the mixture of (a) and (b).

Curing of the mixtures takes place after the addition of catalysts, preferably at about 20° to about 150° C. To obtain optimum properties, it is usually advisable to carry out an after-curing of the resulting plastics at temperatures from about 50° to about 250° C., preferably from about 200° to about 230° C.

The process according to the invention may also be carried out for the preparation of impregnating masses, for electrical insulations, or for glass fiber reinforced laminates. The process according to the invention is suitable for the production of electrical parts by the casting process, including production of, for example, printed circuits, electronic clocks, pocket calculators, electronic cameras, computers, micro-computers, and digital data stores.

The heat resistance of the products obtained by the process according to the invention, the low dielectric losses, the moisture resistance, and the abrasion resistance, as well as the processing properties in molds, are excellent. The process according to the invention is also suitable for the production of insulating materials of insulating classes H and C (JEC 85/Publication 84) in electric motors and generators, and for the production of construction materials for aircraft, rockets, or other apparatus subjected to severe stresses. Insulators, transformers, condensers, and laminates for the production of pipes, containers, or sports equipment may also be produced. The mixtures may also be used for the production of foams if they are processed in combination with suitable blowing agents.

The following examples further illustrate details for the preparation of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all percentages are percentages by weight.

DESCRIPTION OF THE PREFERRED EMBODIMENTS

EXAMPLE 1

Preparation of reactive resin (I).

A mixture of 120 parts by weight of 60% 2,4'-diisocyanatodiphenylmethane and 40% 4,4'-diisocyanateodiphenylmethane (isocyanate content 33.6%) ("MDI") is mixed with 30 parts by weight of the diglycidyl ether of bisphenol A (epoxide number 0.5) and 1.5 ml of a separately prepared 1M solution of p-toluenesulfonic acid methyl ester in the above-mentioned diisocyanate mixture (MDI). The resultant mixture is heated at 120° C. under nitrogen with stirring for 30 minutes and then cooled. The resultant reactive resin (I) has the following characteristics:

| % NCO | 26.2 (based on the total mixture) |
|---|---|
| viscosity $\eta_{25° C.}$ | 55 mPa.s |

Reactive resin (I) is then stored at 50° C. and the isocyanate number of the mixture is determined after the given time t (hours):

| Storage at 50° C. t (hours) | % NCO |
|---|---|
| 24 | 26.2 |
| 72 | 26.2 |
| 144 | 26.1 |
| 216 | 26.2 |
| 240 | 26.2 |

The constancy of the isocyanate content indicates that the reactive resin according to the invention is completely stable in storage.

EXAMPLE 2

Comparison example

Preparation of resin (II).

The procedure is the same as in Example 1 except that the p-toluenesulfonic acid methyl ester is not added to the reaction mixture. The mixture of 120 parts by weight of the diisocyanate mentioned in Example 1 (i.e., MDI) and 30 parts by weight of the diglycidyl ether of bisphenol A (epoxide number 0.5) is heated at 120° C. under nitrogen with stirring for 30 min and then cooled. The resultant reactive resin (II) has the following characteristics:

| % NCO | 24.9 |
|---|---|
| Viscosity $\eta_{25°\,C}$ | 100 mPa.s. |

Reactive resin (II) is also stored at 50° C. and the isocyanate number of the mixture is determined after the given time t (hours).

| Storage at 50° C. t (hours) | % NCO |
|---|---|
| 24 | 24.5 |
| 72 | 23.0 |
| 144 | 22.0 |
| 216 | 19.9 |
| 240 | 19.1 |

EXAMPLE 3

Use of the reactive resin (I) for the production of molded articles

Reactive resin (I) of Example 1 (100 parts by weight) is mixed with 0.5 ml (3.2 mol) of dimethylbenzylamine, and the mixture is degassed in a vacuum with stirring and poured into a mold. The mold is placed in an oven heated to 120° C. and left at this temperature for 30 minutes. A rigid board of a plastic containing isocyanurate and oxazolidinone structures is obtained.

This example shows that storage stable reactive resins of type (I) can be hardened to duromers without any significant retardation in reaction after the addition of catalysts.

EXAMPLE 4

Conventional test process for casting resins known in the art

A casting resin compound consisting of 100 parts by weight of a liquid glycidyl ether of bisphenol A which has been purified by distillation (epoxide value 0.54 to 0.57; viscosity about 750 mPa.s at 70° C.) and 120 parts by weight of methyl hexahydrophthalic acid anhydride (viscosity about 40 mPa.s at 25° C.: saponification number 655 to 670) is used for the total immersion process of electric machines. This composition is examined for buildup of viscosity by testing one sample of about 250 g of the mixture at 100° C. over a period of 20 hours and another sample of about 250 g of the mixture at 70° C. over a period of 10 days.

The following results are obtained for the first sample:

| Initial viscosity of the mixture at 70° C.: | ca. 17.5 mPa.s |
|---|---|
| Increase in viscosity after storage for 20 h at 100° C.: | ≦ 3 mPa.s |
| Final value at 70° C.: | max 20.5 mPa.s |

The properties determined for the second sample are as follows:

| Initial viscosity of the mixture at 70° C.: | ca. 17.5 mPa.s |
|---|---|
| Viscosity increase after storage for 10 days at 70° C.: | 22 mPa.s (70° C.) |

EXAMPLE 5

Comparison example

A casting resin composition corresponding to that of Example 2 was subjected to a viscosity buildup test as described in Example 4. The following results were obtained:

| First sample: | |
|---|---|
| Initial viscosity of the mixture at 40° C.: | ca. 67 mPa.s |
| Viscosity increase after storage for 20 h at 100° C.: | 82 mPa.s (40° C) |
| Final value at 70° C.: | 149 mPa.s |
| Second sample: | |
| Initial viscosity of the mixture at 40° C.: | ca. 67 mPa.s |
| Viscosity after storage for 10 days at 70° C.: | ≧ 600 mPa.s (40° C.) |

EXAMPLE 6

A casting resin composition corresponding to that of Example 1 was subjected to a viscosity buildup test as described in Example 4. The following results were obtained:

| First sample: | |
|---|---|
| Initial viscosity of the mixture at 40° C.: | ca. 17.5 mPa.s |
| Viscosity increase after storage for 20 h at 100° C.: | 0.9 mPa.s |
| Final value at 40° C.: | 18.4 mPa.s |
| Second sample: | |
| Initial viscosity of the mixture at 40° C.: | ca. 17.5 mPa.s |
| Viscosity after storage for 10 days at 70° C.: | 21.3 mPa.s (40° C.) |

It is evident that the viscosity increase is distinctly lower in the stabilized mixture than in the epoxide resin mixture previously used. In practice, this means a longer service life for the impregnating bath. Another advantage is that the mixture has the same low viscosity at 40° C. as the epoxide resin system at 70° C.

EXAMPLE 7

Comparison Example

Portions (100 g each) of the casting resin composition of the comparison example (Example 2) were each mixed with 1 g of catalyst. The following catalysts were used:
  a) dimethylbenzylamine
  b) dimethylbenzylamine dibutylphosphate.

The pot life of the reaction mixture containing catalyst (a) was determined by VDE at 23° C. and found to be 21 minutes. The gel time of the reaction composition containing catalyst (b) was determined by DIN 16916 at 160° C. and found to be about 300 sec.

The casting resin compositions were cast into aluminum molds and cured by heating at 4 h/80° C.+4 h/120° C.+4 h/160° C.+16 h/250° C. The plates obtained, measuring 200×300×4 mm, were cut up into test samples used to determine the mechanical properties shown in the following Table A:

TABLE A

|  | Catalyst a | Catalyst b | Method of Measurement: DIN |
|---|---|---|---|
| Tensile Strength (N/mm²) | 41 | 51 | 53,455 |
| Elongation at break (%) | 2.0 | 2.0 | 53,455 |
| E-modulus from tensile test (N/mm²) | 3100 | 2990 | 53,457 |
| Flexural strength (N/mm²) | 112 | 125 | 53,452 |
| Edge fiber elongation (%) | 4.3 | 5.5 | 53,452 |
| Impact strength (kJ/m²) | 12 | 10.7 | 53,452 |
| Ball pressure hardness (N/mm²) | 237 | 232 | 53,456 |
| Martens degree (°C.) | >250 | 250 | 53,458 |

EXAMPLE 8

According to the invention

A catalyst (1 g) was added to each 100 g portion of casting resin composition from Example 1. The following catalysts were used:
a) dimethylbenzylamine and
b) dimethylbenzylamine dibutylphosphate The pot life of the mixture containing catalyst (a) was determined at 23° C. and found to be 22 minutes. The gel time of the mixture containing catalyst (b) was determined at 160° C. and found to be 600 sec.

Plates measuring 200×300×4 mm were cast in aluminum molds and cured by heating at 4 h/80° C.+4 h/120° C.+4 h/160° C.+16 h/200° C. The plates were cut up into test samples used to determine the mechanical properties shown in the following Table B.

TABLE B

|  | Catalyst a | Catalyst b | Method of Measurement: DIN |
|---|---|---|---|
| Tensile strength (N/mm²) | 38 | 48 | 53,455 |
| Elongation at break (%) | 2.0 | 2.0 | 53,455 |
| Flexural strength (N/mm²) | 111 | 114 | 53,452 |
| Edge fiber elongation (%) | 4.2 | 5.5 | 53,452 |
| E-modulus from tension test (N/mm²) | 3100 | 3050 | 53,457 |
| Impact strength (kJ/m²) | 14 | 12 | 53,453 |
| Ball pressure hardness (N/mm²) | 240 | 232 | 53,456 |
| Dimensional stability under heat according to Martens (°C.) | 250 | 250 | 53,458 |

All the results obtained in Examples 7 and 8 lie within the range of fluctuation usual for duroplasts. The alkylating agent has no effect on the mechanical strength properties.

EXAMPLE 9

A polyisocyanate containing carbodiimide groups according to U.S. Pat. No. 3,152,162 and having an isocyanate content of 29% (1000 parts by weight) is mixed with 680 parts by weight of a diglycidyl ether of bisphenol A (epoxide number 0.5) and 5.1 ml of a separately prepared 1M solution of p-toluenesulfonic acid methyl ester in the above mentioned diisocyanate mixture. The resultant mixture is heated at 120° C. under nitrogen with stirring for 30 minutes and then cooled. The resultant reactive resin (III) has the following characteristics:

| % NCO | 15.6 |
|---|---|
| Viscosity $\eta_{25°\ C.}$ | 470 mPa.s. |

The reactive resin is stored at 60° C. for 144 hours and the isocyanate number of the mixture is found to be 15.6% NCO. The reactive resin is thus completely stable in storage.

EXAMPLE 10

A mixture of 80 parts by weight of polyphenyl-polymethylene polyisocyanates obtainable by aniline-formaldehyde condensation followed by phosgenation (NCO content 29.9%) ("crude MDI") is mixed with 20 parts by weight of a diglycidyl ether of bisphenol A (epoxide number 0.5) and 0.186 g (1 mol) of p-toluenesulfonic acid methyl ester. The mixture is heated at 120° C. under nitrogen with stirring for 30 minutes. A reactive resin (IV) having the following characteristics is obtained after cooling:

| % NCO | 23.6 |
|---|---|
| Viscosity $\eta_{25°\ C.}$ | 1120 mPa.s. |

What is claimed is:

1. A composition comprising a storage stable resin reaction mixture obtained by mixing simultaneously or successively
    (a) at least one organic polyisocyanate,
    (b) at least one organic compound containing at least two epoxide groups, and
    (c) at least one alkylating agent that inhibits reaction of isocyanate groups of component (a) and epoxide groups of component (b).

2. A composition according to claim 1 wherein said reaction mixture additionally comprises
    (d) further auxiliary agents and additives.

3. A composition according to claim 1 wherein polyisocyanate (a) corresponds to the formula $Q(NCO)_n$, wherein
    n is a number of from about 2 to about 4, and
    Q is an aliphatic hydrocarbon group having about 2 to about 18 carbon atoms; a cycloaliphatic hydrocarbon group having about 4 to about 15 carbon atoms; an aromatic hydrocarbon group having about 6 to about 15 carbon atoms; or an araliphatic hydrocarbon group having about 8 to about 15 carbon atoms.

4. A composition according to claim 1 wherein polyisocyanate (a) is a mixture of isomers or homologs of polyisocyanates of the diphenylmethane series.

5. A composition according to claim 1 wherein component (b) contains 2 to 4 epoxide groups per molecule and has an epoxide equivalent weight of from 90 to 500.

6. A composition according to claim 1 wherein alkylating agent (c) contains a transferable alkyl group having from about 1 to about 4 carbon atoms.

7. A composition according to claim 6 wherein alkylating agent (c) is used in a quantity of from about 0.001 to about 1% by weight, based on the total weight of components (a) and (b).

8. A composition according to claim 1 wherein component (c) is an organic sulfonic acid ester, methyl iodide, or dimethyl sulfate.

9. A composition according to claim 2 wherein component (d) is
   (d1) a polymerizable olefinically unsaturated monomer, or
   (d2) an organic compound having a molecular weight range of from about 62 to about 2000 and containing at least 2 alcoholic hydroxyl groups.

10. A composition according to claim 1 wherein component (b) is used in a quantity corresponding to an equivalent ratio of isocyanate groups of component (a) to epoxide groups of component (b) of from about 1.2:1 to 500:1.

11. A composition according to claim 10 wherein component (c) is used in a quantity of from about 0.001 to about 1% by weight, based on the sum of components (a) and (b).

12. A composition according to claim 1 comprising a storage stable resin reaction mixture obtained by mixing simultaneously or successively
   (a) a mixture of isomers or homologs of polyisocyanates of the diphenylmethane series,
   (b) at least one organic compound containing 2 to 4 epoxide groups per molecule and having an epoxide equivalent weight of from 90 to 500,
   (c) at least one alkylating agent containing a transferable alkyl group having from about 1 to about 4 carbon atoms in a quantity of about 0.001 to about 1% by weight, from based on the total weight of components (a) and (b), and
   (d) a polymerizable, olefinically unsaturated monomer, or an organic compound having a molecular weight range of from about 62 to about 2000 and containing at least 2 alcoholic hydroxyl groups.

13. A process for the preparation of a composition according to claim 1 comprising
   (1) mixing together components (a), (b), and (c) simultaneously or successively, and
   (2) heating the resultant mixture of components within a temperature range of about 20° to about 150° C.

14. A process for the preparation of a composition according to claim 2 comprising
   (1) mixing together components (a), (b), (c), and (d) simultaneously or successively, and
   (2) heating the resultant mixture of components within a temperature range of about 20° to about 150° C.

15. A process for the preparation of a composition according to claim 1 comprising
   (1) preparing an initial mixture containing at least components (b) and (c),
   (2) heating the resultant initial mixture within a temperature range of about 20° to about 150° C., and
   (3) adding any remaining component (a).

16. A process for the preparation of a composition according to claim 2 comprising
   (1) preparing an initial mixture containing at least components (b) and (c),
   (2) heating the resultant initial mixture within a temperature range of about 20° to about 150° C., and
   (3) adding any remaining components (a) and (d).

17. In a method of producing molded articles, electrical insulating materials, coatings, adhesives, and foams, the improvement comprising curing a composition according to claim 1 by the addition of a catalyst.

* * * * *